Jan. 31, 1939.  L. J. BISHOP  2,145,643
POWER TRANSMITTING UNIT
Filed July 15, 1935  2 Sheets-Sheet 1

INVENTOR
LEONARD J. BISHOP
BY
ATTORNEYS

INVENTOR
LEONARD J. BISHOP

Patented Jan. 31, 1939

2,145,643

UNITED STATES PATENT OFFICE 2,145,643

POWER TRANSMITTING UNIT

Leonard J. Bishop, Detroit, Mich., assignor to Mechanical Handling Systems, Inc., Detroit, Mich., a corporation of Michigan Application July 15, 1935, Serial No. 31,507

3 Claims. (Cl. 74—230.17)

This invention relates generally to power transmitting devices and refers more particularly to devices of this character embodying variable speed mechanism, as well as torque increasing means.

One of the principal features of the present invention consists in combining all of the elements of power transmitting devices of the character set forth into a single unit, and so arranging the several elements as to provide a more compact assembly. In other words, the present invention contemplates a power transmitting device capable of being installed in an extremely small space as compared to the large reduction available, and this is desirable in that it not only effects a saving in floor space, but, also renders it possible to more conveniently handle the unit during installation.

Another advantageous feature of the present invention consists in the provision of a power transmitting device of the type previously set forth, wherein all of the elements are housed within a casing of extremely small size, as compared to the ratio of reduction, and wherein provision is made for expediently repairing or replacing either or all of the individual elements.

Still another object of the present invention consists in the provision of a construction of the aforesaid character rendering it possible to utilize equipment of a standard nature in forming the power transmitting unit.

In addition, the present invention contemplates a relatively simple power transmitting device capable of being inexpensively manufactured, assembled and installed. The latter, as well as the foregoing, and other advantageous features will be made more apparent as this description proceeds, especially when considered in connection with the accompanying drawings, wherein.

Figure 1:
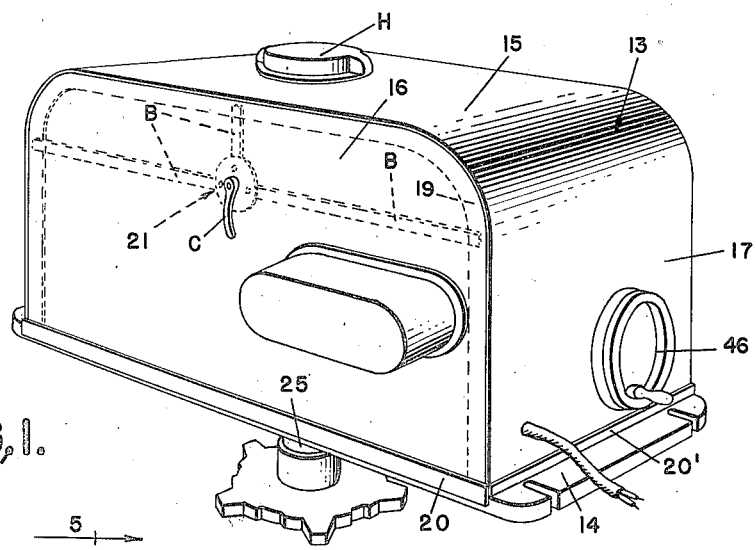
Figure 1 is a perspective view of a power transmitting unit constructed in accordance with this invention.
Figure 3:
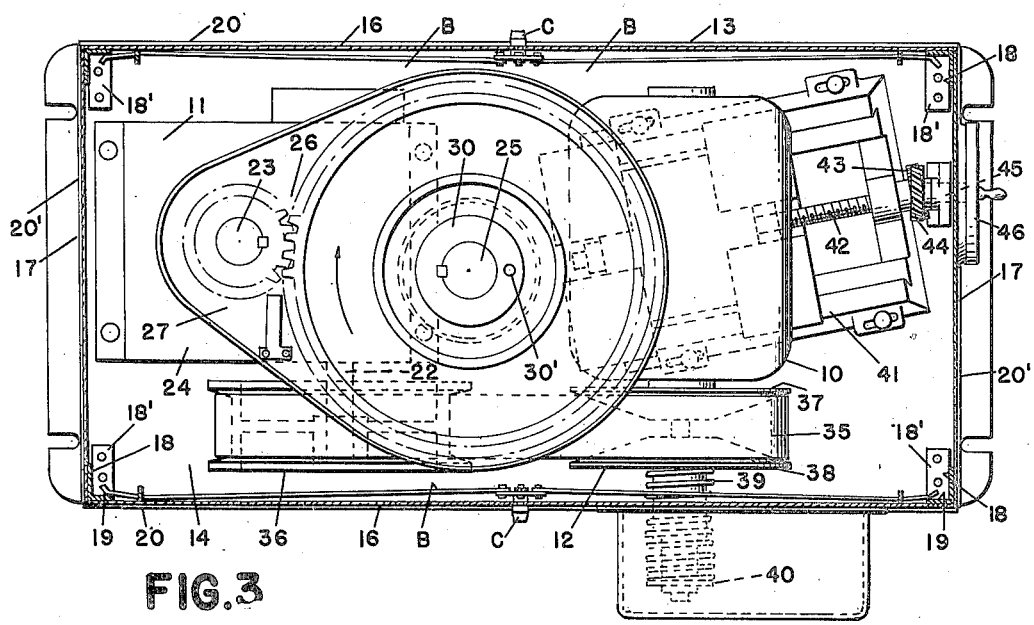
Figure 3 is a horizontal sectional view taken substantially on the line 3—3 of Figure 2.
Figure 2:
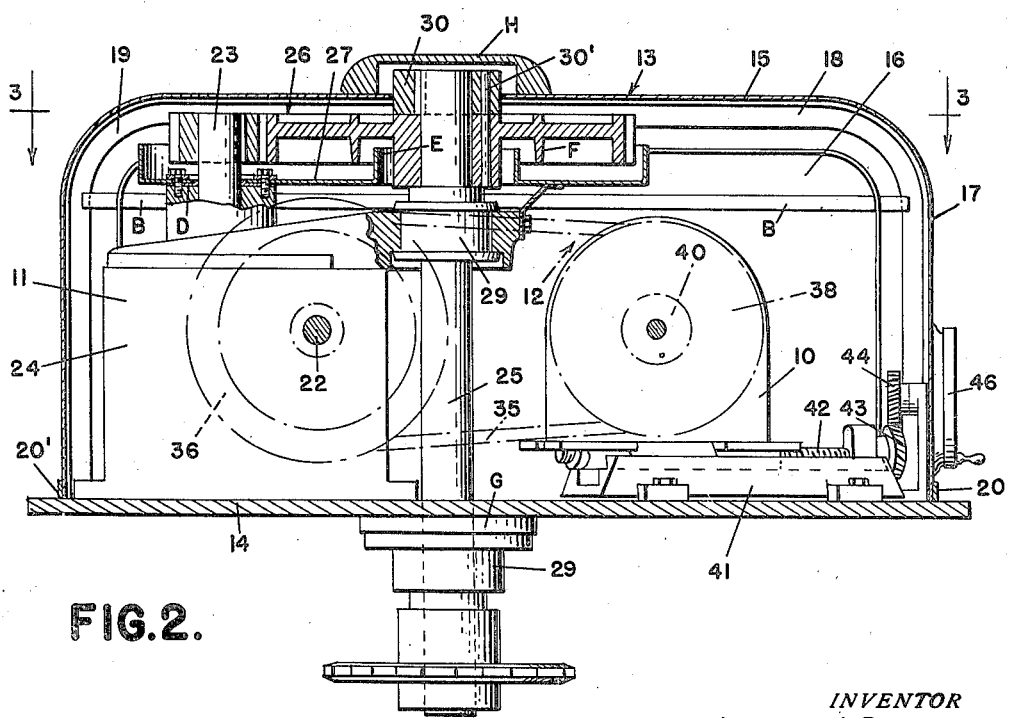
Figure 2 is a sectional view through the construction shown in Figure 1.

Referring now to the drawings and with special reference to the power transmitting unit featured in Figures 1 to 3 inclusive, it will be noted that this unit comprises a prime mover in the form of an electric motor 10, a reducing device 11, and variable speed mechanism 12 operatively connecting the reducing device to the motor 10. As previously stated, it is one of the primary objects of this invention to so construct and arrange the foregoing elements as to permit the same to be combined into a compact unit occupying considerably less space than heretofore thought possible. The combination of the foregoing parts into a single compact unit is, of course, desirable in that it not only effects an appreciable saving in floor space, but, in addition, materially simplifies the construction, in that it eliminates the usual means of connection between the independent units and also the individual supporting means for these units.

All of the units generally referred to above are arranged in a casing 13, and due to the compactness of the arrangement, the casing is relatively small, as will be appreciated upon viewing Figures 1 to 3 inclusive of the drawings. In detail, the casing 13 is provided with a supporting base 14 for the various parts of the power transmitting unit, and is further provided with top, side and end walls 15, 16 and 17 respectively. The top and end walls are preferably formed of a single strip of sheet metal preferably welded to and supported upon a pair of inverted U-shaped frame members 18 removably secured to the base 14 by means of brackets 18'. One of the frame members 18 is located at the front side of the casing, while the other frame member is located at the rear side of the casing, and both frame members are substantially angle shaped in cross section, so as to not only provide transverse flanges for supporting the opposite side edge portions of the walls formed by the sheet metal strip previously referred to, but to also provide vertical flanges 19 for engaging the side walls 16 of the case. The base 14 is preferably a plate and has welded or otherwise suitably secured thereto, the up-standing side and end strips 20 and 20'. The bottom edges of the end walls frictionally engage the inner sides of the end strips 20' so as to permit the top and end walls to be readily removed when access to the several units within the casing is necessary.

Both the front and rear walls 16 are removably secured in abutting relationship to the vertical flanges 19 of the frame members 18 and the bottom edges of both of these walls are positioned in engagement with the frame members 18 by means of the side strips 20 previously set forth. In this connection, attention may be called to the fact that the width of the top and end walls is slightly greater than the distance between the vertical flanges of the frame members 18, so that the marginal edges of the aforesaid walls will overlap the adjacent edges of the side walls 16. In the present instance, each of the side walls 16 is removably held in place by means of latch mechanism designated diagrammatically in Figure 1 by the reference character 21, and comprising a plurality of bars B movable into latching engagement with the vertical flanges of the frame members 18 by means of a crank C mounted for manipulation exteriorly of the casing.

Referring now more in detail to the several elements combined to form the power transmitting unit, and with special reference to the reducing device 11, it will be noted that the latter comprises a drive shaft 22 and a driven shaft 23 connected to the drive shaft, through the medium of suitable reduction gearing (not shown) located within the housing 24 of the reducing unit. In the present instance, the drive shaft is journaled in the housing for rotation by the motor 10 about a horizontal axis, while the driven shaft is journaled in the housing 24 for rotation about a vertical axis, and the upper end of the latter shaft is connected to a power take-off shaft 25, through the medium of additional reduction gearing 26. The reduction gearing 26 is positioned in the upper portion of the casing above the reducing device 11, and since this gearing may be extended over the motor 10, it necessarily follows that a relatively large reduction ratio may be provided with the minimum size of casing. The material saving in space effected by locating the reduction gearing 26 in the zone aforesaid in the casing will be readily appreciated when considering that if this reduction gearing were incorporated in the reducing device 11, the latter would necessarily occupy a considerably greater area in the casing, and it would be impossible to accommodate this mechanism in a casing of the size illustrated herein. It may be pointed out at this time that lubrication of the reduction gearing 26 is provided for, by arranging a lubricant reservoir 27 beneath the gearing. As shown in Figure 2, the reservoir 27 is provided with spaced openings therethrough for receiving the driven shaft 23 and the power take-off shaft 25. In order to prevent lubricant from escaping through the opening in the reservoir for the driven shaft, a gasket D is clamped between the base of the reservoir and the adjacent surface of the reducer 24. On the other hand, lubricant is prevented from escaping through the opening for the power take-off shaft by forming an annular up-standing flange E on the base of the reservoir around the aforesaid opening therethrough. The annular flange E encircles the hub of the reduction gear on the power take-off shaft and the latter gear is provided with a depending annular rib F surrounding the flange E to prevent surging of the lubricant in the reservoir.

The power take-off shaft 25 extends vertically through the housing and is journaled in self-aligning bearings 29. The upper bearing is supported by the housing 24 of the reducer, while the lower bearing is secured to the underside of the base 14 through the medium of an adaptor G. Upon reference to Figure 2, it will be noted that the hub of the reduction gear on the power take-off shaft is secured to the latter through the medium of a shear hub 30 keyed on the power take-off shaft above the reduction gear on the latter and connected to the hub of this gear by means of a shear pin 30′ adapted to disconnect the reduction gear from the power take-off shaft in the event undue strain is placed upon the mechanism. If desired, the shear hub may be concealed by a cover H secured to the top wall 15 of the casing.

It will be observed from Figure 2, that the drive shaft 22 of the reducing unit 11 is driven by the motor 10 through the medium of the variable speed pulley 12, and the principle of operation of this pulley to vary the speed of the drive shaft 22 may be the same as the Reeves type pulley. Briefly described, the pulley comprises two opposing cone-faced disks secured to the motor shaft for rotation therewith as a unit and adapted to receive therebetween a Reeves type of V-belt 35 connecting the pulley 12 with a pulley 36 secured to the end of the drive shaft 22. The cone-faced disk 37 of the pulley 12 is fixed against sliding movement on the motor shaft, while the disk 38 is mounted upon the shaft for movement axially thereof toward and away from the disk 37. Axial movement of the disk 38 in a direction away from the disk 37 is resisted by means of a suitable coil spring 39 having one end engaging an abutment 40 secured to the shaft and having the opposite end engaging the disk 38. The arrangement is such that movement of the motor 10 in a direction away from the driven pulley 36 causes the disk 38 to move in a direction away from the disk 37 against the action of the spring 39 and thereby permits the V-belt to assume a smaller arc of contact or diameter between the disks, and this obviously results in a reduction in speed of the driven pulley. From the foregoing, it necessarily follows that movement of the motor 10 toward the driven pulley increases the arc of contact of the V-belt with the pulley, and thereby increases the speed of the driven pulley 36.

In order to provide for the aforesaid sliding movement of the motor, the latter is mounted upon a plate which in turn is slidably supported upon a base 41 secured to the bottom 14 of the casing 13. As will be observed from Figures 2 and 3, movement of the plate relative to the base 41 is effected by means of a screw 42 having a pinion 43 secured thereto and adapted to mesh with the corresponding pinion 44 fixed to the operating shaft 45. The operating shaft 45 is mounted above the screw 42 and projects through the adjacent end wall of the casing for operation by the hand wheel 46. The diameters of the pinions connecting the screw with the operating shaft are so determined as to provide the elevation of the operating shaft required for accommodation of the hand wheel 46. It will, of course, be understood that the operating shaft 45 may be connected to the screw 42 by various other types of mechanical connections, and also that the shaft 45 may be automatically operated through a remote control system, if desired.

Upon referring to Figure 3, it will be noted that the motor is mounted for sliding movement relative to the base at a slight angle, and this practice is desirable, since it tends to maintain the center line of the belt 35 in the same position irrespective of adjustment of the pulley 12 to vary the speed of the driven pulley 36. The aforesaid angular movement of the motor may be obtained by securing the base 42 at an angle to the median center line of the casing as shown herein, or the same effect may be realized by mounting the motor supporting plate on the base 42, in such a manner that the plate will be moved at the desired angle. In either case, the teeth on the pinions 43 and 44 are correspondingly inclined with respect to the axes of rotation thereof in order to avoid the necessity of inclining the operating shaft.

Figure 4:
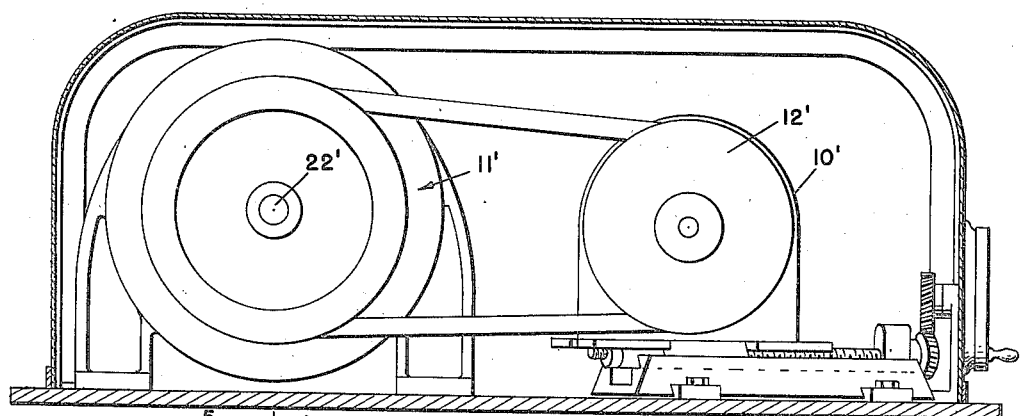
Figure 4 is a similar view to Figure 2 showing a slightly modified form of construction.
Figure 5:
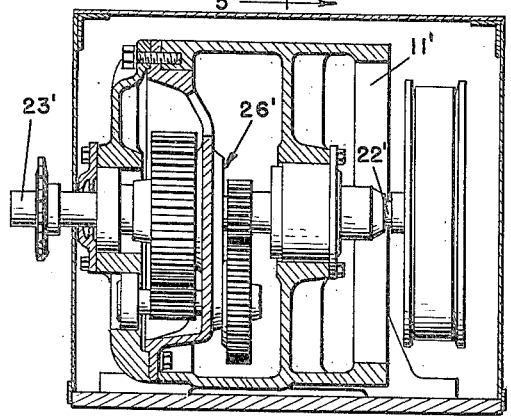
Figure 5 is a sectional view taken substantially on the line 5—5 of Figure 4.

Referring now to the embodiment of the invention illustrated in Figures 4 and 5, it will be noted that the same differs from the one previously described principally in the construction of the reducing unit 11'. In the present instance, the power take-off shaft 23' is disposed in horizontal alignment with the drive shaft 22' and is connected to the latter through the medium of reduction gearing 26' located entirely within the housing 24' of the unit. The shaft 22' is driven by an electric motor 10' through a Reeves type of variable speed pulley 12' in exactly the same manner as previously described, and the means for adjusting the pulley 12' may also be identical to the means defined in connection with the first embodiment of this invention.

From the foregoing, it will be observed that I have provided a relatively simple and inexpensive power transmitting unit capable of being accommodated in a comparatively small space. In addition, it will be noted that the unit, although extremely compact in nature, is so arranged that the several elements thereof are readily accessible for replacement or repair. Moreover, notwithstanding the compact nature of the unit, relatively large reductions are possible, and this feature as well as the foregoing, is extremely advantageous where the installation space is limited.

What I claim as my invention is:

1. In a power transmitting unit, a casing, a prime mover assembly located in the casing including a prime mover having a shaft and a drive shaft parallel to and connected to the prime mover shaft by means of a variable speed belt drive, a reduction device also mounted in the casing and having a driven shaft operatively connected to said drive shaft through the medium of reduction gearing of insufficient ratio to provide the desired reduction, the axis of said driven shaft being transverse to the axis of said drive shaft, a power take-off shaft journaled in the casing and having its axis of rotation parallel to the axis of rotation of the driven shaft, said take-off shaft being disposed between said prime mover and said drive shaft, and means operatively connecting the power take-off shaft to the driven shaft comprising additional reduction gearing arranged in one plane in the casing in overlapping relation to the reduction device and prime mover assembly.

2. In a power transmitting unit, a prime mover having a shaft, a reduction device having a drive shaft, a variable speed belt drive connecting the prime mover shaft to the drive shaft of the reduction device and including a pulley on each of said shafts, one of said pulleys comprising opposed cone-shaped discs movable axially relative to each other to vary the effective size of the pulley, means for varying the position of said prime mover to effect relative movement of said discs, a power take-off shaft supported between the prime mover and said drive shaft and extending in a direction transverse to the axes of the latter shaft, and means including reduction gearing operatively connecting the power take-off shaft to the drive shaft of the reduction device.

3. In a power transmitting unit, a prime mover having a rotatable shaft, a reduction device having a drive shaft, a belt drive including pulleys on said shafts, one of said pulleys comprising opposed cone-shaped discs, one of said discs being axially movable relative to the other, a belt connecting said pulleys, means for bodily moving one of said pulleys away from the other pulley to effect the relative movement aforesaid of said discs, said last mentioned means moving said prime mover diagonally with respect to the axes of said pulleys, a power take-off shaft rotatably supported between the prime mover and said drive shaft with its axis extending transverse to the axes of the latter shaft, and means operatively connecting the power take-off shaft to the drive shaft of the reduction device including reduction gearing located in a plane transverse to the axis of said take-off shaft and overlapping relation to the reduction device and prime mover.

LEONARD J. BISHOP.